US007178161B1

(12) United States Patent
Fristoe et al.

(10) Patent No.: US 7,178,161 B1
(45) Date of Patent: Feb. 13, 2007

(54) METHOD AND APPARATUS FOR CREATING A CONNECTION SPEED DETECTING MOVIE AND RICH MEDIA PLAYER CUSTOMIZATION ON THE FLY

(75) Inventors: Tom Fristoe, Pleasanton, CA (US); Ming-Horng Lee, San Ramon, CA (US); Cary Capece, Pleasanton, CA (US)

(73) Assignee: Tentoe Surfing, Inc., Pleasanton, CA (US)

( * ) Notice: Subject to any disclaimer, the term of this patent is extended or adjusted under 35 U.S.C. 154(b) by 929 days.

(21) Appl. No.: 09/765,926

(22) Filed: Jan. 18, 2001

(51) Int. Cl.
*H04N 7/173* (2006.01)
*H04N 5/445* (2006.01)
*G06F 13/00* (2006.01)
*G06F 3/00* (2006.01)
*G06F 15/16* (2006.01)

(52) U.S. Cl. ............................. 725/86; 725/36; 725/41; 725/42; 725/43; 725/44; 725/51; 725/54; 725/109; 725/112; 725/113; 725/114; 725/115; 725/116; 709/228; 709/237; 715/716; 715/719; 715/720; 715/721; 715/722; 715/749; 715/760; 715/762

(58) Field of Classification Search .................. 725/32, 725/36, 37, 40–44, 51, 54–55, 109, 112–116, 725/86; 345/716, 719–722, 730, 749, 760, 345/762; 715/716, 719–722, 730, 749, 760, 715/762; 709/228, 231
See application file for complete search history.

(56) References Cited

U.S. PATENT DOCUMENTS

| | | | | |
|---|---|---|---|---|
| 5,928,330 A | * | 7/1999 | Goetz et al. ................. | 709/231 |
| 5,956,729 A | * | 9/1999 | Goetz et al. .............. | 707/104.1 |
| 6,148,311 A | * | 11/2000 | Wishnie et al. .............. | 715/513 |
| 6,188,398 B1 | * | 2/2001 | Collins-Rector et al. ....... | 725/37 |
| 6,248,946 B1 | * | 6/2001 | Dwek ........................... | 84/609 |
| 6,256,669 B1 | * | 7/2001 | Hurwitz ...................... | 709/224 |
| 6,327,609 B1 | * | 12/2001 | Ludewig et al. ............. | 709/203 |
| 6,715,126 B1 | * | 3/2004 | Chang et al. ............. | 715/500.1 |
| 6,802,061 B1 | * | 10/2004 | Partovi et al. ............... | 717/173 |
| 6,985,934 B1 | * | 1/2006 | Armstrong et al. ......... | 709/231 |

OTHER PUBLICATIONS

RealPlayer 8 Plus User Manual, 2000, RealNetworks, Inc., Revision 1.0, pp. 45-65.*

* cited by examiner

*Primary Examiner*—John Miller
*Assistant Examiner*—Michael W. Hoye
(74) *Attorney, Agent, or Firm*—John W. Carpenter; Reed Smith, LLP (57) ABSTRACT

A master movie and player are created on the fly. The master movie is created based on characteristics of a movie or other asset to be viewed by the player. The player is constructed from a template having rudimentary player capabilities for a predetermined connection speed. Tracks selected by suppliers and user/e-tailers are added to customize the player. Different players are constructed for various predetermined connection speeds. When an asset is to be viewed, a server downloads the master movie matching a content viewer's request to the content viewer's machine. The master movie determines the connection speed and send a message back to the server. The server then downloads the player for the asset requested by the content viewer and matching the content viewer's connection speed. The requested asset is then streamed to the content viewer.

14 Claims, 10 Drawing Sheets

METHOD AND APPARATUS FOR CREATING A CONNECTION SPEED DETECTING MOVIE AND RICH MEDIA PLAYER CUSTOMIZATION ON THE FLY

CROSS REFERENCE TO RELATED INVENTIONS

This invention is related to the following co-filed, co-pending U.S. patent application, Lee et al, entitled "Method And Apparatus For Creation And Syndication Of A Secure Link," U.S. application Ser. No. 09/767,291, filed, 18 Jan., 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to creating links for web pages. The invention is more specifically related to links that invoke streaming content from a server, and to the creation of a master movie on the fly that is played on a content viewer's machine to determine connection speed, and the creation of a movie player on the fly that is sent to the content viewer's machine to provide a rich interactive user interface and to play the content to be streamed to the content viewer.

2. Discussion of Background

As communications via the Internet have progressed over time, various standards have emerged which attempt to define the manner in which information is transferred over the Internet. These standards define not only the communication mechanisms employed but also the format in which the information is packaged, how information is routed based upon its content and how it is interpreted upon receipt. Examples of communication standards that have been developed specifically for the Internet include the Transfer Control Protocol/Internet Protocol (TCP/IP) and the HyperText Transfer Protocol (HTTP). Further, examples of standards that define communication content, organization and structure include the Hypertext Markup Language (HTML) and the Wireless Markup Language (WML), among other standards.

HTTP provides for the delivery of Uniform Resource Identifiers (URIs) from clients to servers and the delivery of text files from servers to clients and is part of the TCP/IP protocol suite. HTTP is an application-level protocol for distributed, collaborative, hypermedia information systems and has been in use by the World-Wide Web global information initiative since 1990. HTTP allows an open-ended set of methods that indicate the purpose of a request. It builds on the discipline of reference provided by the URI as a Uniform Resource Location (URL) or Uniform Resource Name (URN), for indicating the resource to which a method is to be applied. Messages are passed in a format similar to that used by Internet mail as defined by the Multipurpose Internet Mail Extensions (MIME). HTTP is also used as a generic protocol for communication between user agents and proxies/gateways to other Internet systems, including those supported by the SMTP, NNTP, FTP, Gopher, and WAIS protocols. In this way, HTTP allows basic hypermedia access to resources available from diverse applications.

Content delivered from HTTP servers (also known as Web servers) to Web browsers is delivered in HTML format. HTML describes how a page is to appear in a device-independent manner. Individual devices interpret the HTML and choose how to best display it, given the restrictions of the local environment. The lowest common denominator for HTML was originally specified to be a VT-100 class terminal with an 80-character wide, continuously scrolling display plus a random access pointing device such as a mouse. Today, most Web content requires a more sophisticated browser that can display bit-mapped graphics, run Java programs and multimedia presentations. HTML does not scale well to small displays and mouseless user interfaces, and is a practical impossibility for delivering information to handheld devices with size, memory and cost constraints.

Rich Media is an approach to Internet advertising that utilizes a number of cutting-edge techniques. These can include animation, audio, video, and different kinds of interactivity that make ads or presentations both memorable and useful for a viewer. Rich media ads and presentations take traditional media assets like video, audio, animation, and photos, and combine them into a multimedia branding experience that streams from an ad server to a publisher site (e.g., e-tailers, like Amazon™, or manufacturers such as Cannon™).

What makes rich media advertising truly unique, and sets it apart from the GIF format, is its interactive nature. Instead of creating a one-way presentation like a television commercial, rich media ads invite the consumer to interact with the ad to gain additional information or insight into the advertiser's products or services. For example, a rich media ad from a car manufacturer might ask the consumer a few questions about their lifestyle, and then deliver information about a particular car model suited to the consumer's choices. Alternatively, a toy company might offer a simple game to show off their latest product. They could also choose to sell their product directly within the rich media ad.

Although the advantages of rich media and other content for advertising and displaying products is readily apparent, some drawbacks limit their effectiveness. For example, security that prevents rich data from being played by unauthorized referring web sites is needed. Furthermore, web developers or other authorized users of rich media (and other content) are in need of consistent methods to refer to rich media assets.

In addition, content viewers have machines that typically run at different connection speeds that creates a need for altering the performance or rate at which content is streamed to the content viewer's machine. The content viewers connection speed is either preset or tested just prior to streaming content. However, current methods for testing connection speed are cumbersome and time consuming as these tests are produced of-line and specifically for the content to be streamed.

To be most effective, players used by content viewer's are customized to the product or manufacturer of the product or service being displayed by the content. However, due to the large number of products and services that may be streamed to potential content viewers, it is cumbersome and time consuming to create players for every asset.

SUMMARY OF THE INVENTION

The present inventors have realized that media content, particularly rich media content, delivered to web site users, is most efficiently deployed in a system that can determine appropriate connection speeds for content. The present invention includes the building of a master movie on the fly that is later played on a content viewer's machine to determine the content viewer's machine connection speed. The content viewer's machine connection speed is normally saved in a profile on the content viewer's machine which the master movie can read, or, alternatively, the mater movie downloads a predetermined file (e.g., 1k–10k file), and calculates the connection speed based on the download time. Using the determined connection speed, the master movie requests, from a streaming server, content matching that connection speed.

The present inventors have realized that creating a master movie on the fly has strong advantages, particularly in a system managing multiple assets to be streamed. The master movie embeds an address of content to be served, and then indexes off that address to request a player of the correct connection speed. Therefore, unless created on the fly, master movies must be created and stored for each asset under management.

The present inventors have also realized that customization of players for viewing content is also best performed on the fly, particularly when multiple tracks that are used differently among a set of assets to be played by the player. A typical player may be constructed with a skin that matches a style of a product or manufacturer, or have buttons and/or icons arranged in a manner that is normally used by a specific manufacturer or e-tailer. Because a large number of products, it is better to be able to create the player on the fly based on pre-selected tracks, rather than build a player off line and then associate the player with a specific piece of content (and potentially building off-line different players for each piece of content (or asset), and each e-tailer to be streamed to a content viewer).

The present invention is best practiced in a system that allows only authorized users access to the content to be streamed (preferably rich media content, however, any type of content may be provided). The present invention includes a simplified and user friendly process for creating and installing links to rich media content for use by web e-tailers and other web sites that provide media content to members, customers, etc. The links are secured so that the media cannot be procured by unauthorized web sites such as gray marketers (e.g., see Lee et al., U.S. application Ser. No. 09/767,291, entitled "Method And Apparatus For Creation And Syndication Of A Secure Link").

In one embodiment, the present invention is a method of producing a movie player on the fly, comprising the steps of accessing a predefined template comprising a basic movie player having tracks and designed to operate a predetermined connection speed, applying a set of selected tracks to the track locations of said template, and saving the player in a place accessible when the player is needed to play content matching the player's connection speed. The player may include at least one of the track locations of said template is a promotional track location, at least one of said supplier and user/e-tailer selected tracks is a promotional track, and said method further comprises the steps of, placing said promotional track in said promotional track, receiving a page or other asset to associate with said promotional track, and linking said promotional track with said page or other asset.

In addition, the invention may be further defined wherein said method further comprises the steps of, receiving a set of parameters indicating when said promotion track is to be active, building the players consistent with said set of parameters, setting alarms to indicate any one of start or expiration of an active promotion track, rebuilding said players to include promotional tracks indicated by said alarms as having become active, and rebuilding said players to remove promotional tracks indicated by said alarms as having become inactive. The players are constructed for various connection speeds. The invention may take the form of a device configured to perform the steps discussed herein.

The present invention includes a method of building a master movie on the fly. And, the present invention also includes using both the master movie and players created on the fly to determine a connection speed and then download an appropriate player to a content viewer.

Both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention is described using terminology for a supplier (customer), provider, e-tailer (user), and content viewer (end user). The supplier (customer) is defined as the manufacturer or producer of a product or service displayed by the present invention. The provider is defined as an entity (TENTOE Inc., for example) that provides links to the supplier's product or service, and provides distribution of a media product describing the supplier's product or service when invoked by the provided link(s). The e-tailer (user) is defined as any entity that utilizes the provider's services products and/or services of the provider. In one embodiment, only e-tailer (user)'s approved by the supplier (customer) are serviced by the present invention. The content viewer (end user) is defined as the viewer of content or media distributed (served) by the provider according to the present invention.

Figure 1:
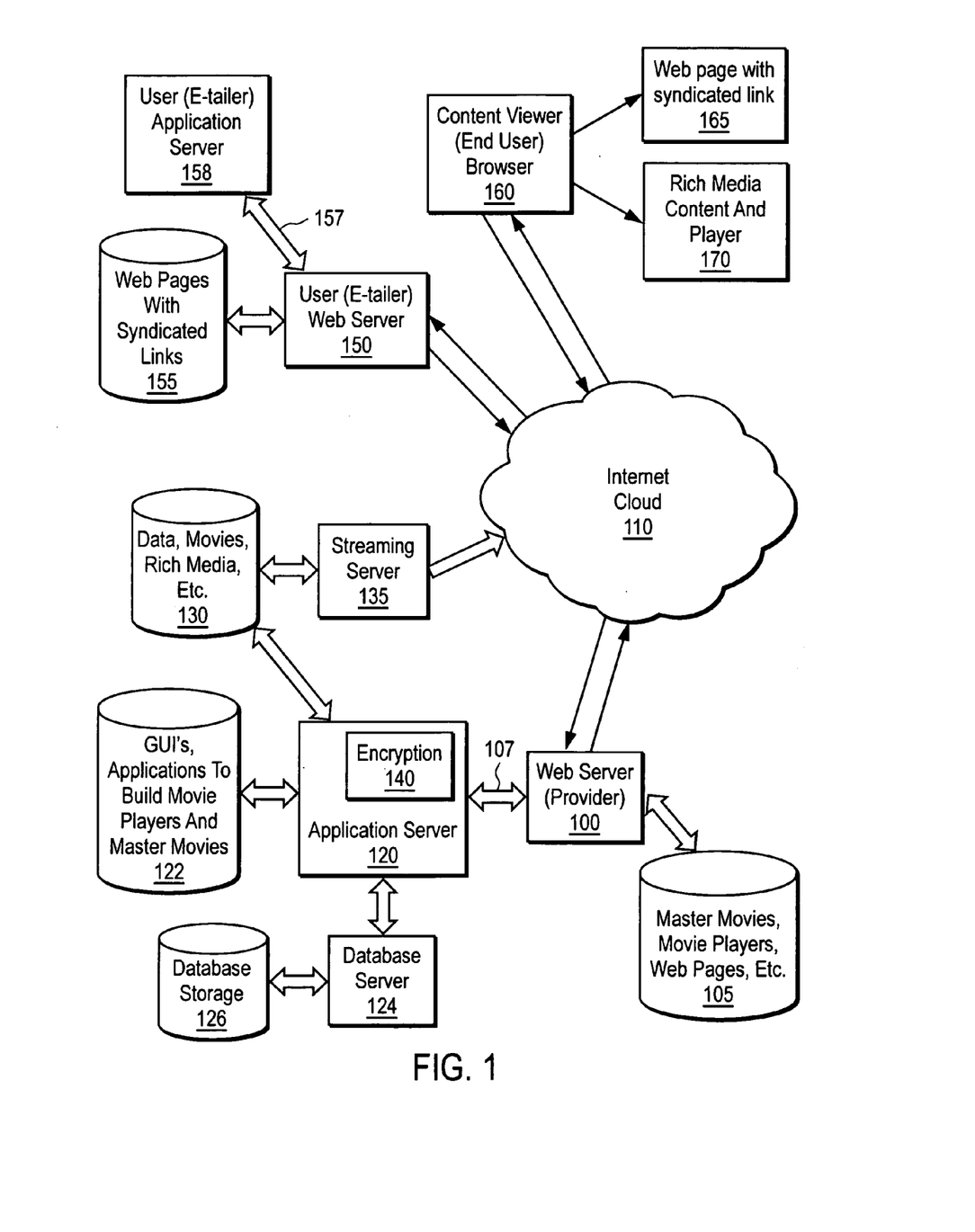
FIG. 1 is a block diagram illustrating processes and data flow for creating a master movie and movie player on the fly.

Referring now to the drawings, wherein like reference numerals designate identical or corresponding parts, and more particularly to FIG. 1 thereof, there is illustrated a block diagram illustrating equipment, processes and data flow for creating a master movie and movie player on the fly. In a preferred embodiment, a provider web server 100 provides syndicated links to streaming (or other) content. The syndicated links are placed on a user web pages 155 accessible to users of the internet 110 or other network (LAN, WAN, etc.) via a user web site 150. The syndicated links may include encrypted portions and provided (e.g. via encryption 140) as described in the above cross referenced patent, Lee et al, U.S. application Ser. No. 09/767,291, entitled "Method And Apparatus For Creation And Syndication Of A Secure Link," which has been incorporated herein by reference in it's entirety. However, the present invention may be practiced using any type of link to content that benefits from knowledge of connection speeds at the end user site and/or utilizes a player that is downloaded to the end user for viewing content.

The content viewer (end user) 160, typically invokes a link from a web page (web page with syndicated link 165, for example) to view content such as a rich media presentation, QTVR, audio files (.wav, .mp3, etc.), graphics, VR, etc. The invoked link sends an http (or other request type) to the provider web server 100.

The application server sends a master movie to the content viewer 160. Master movie is terminology defined as a file that runs on an end users machine and determines the content viewer's connection speed. The connection speed may be any of the standard line speeds (28.8, 56k, ISDN, DSL rate, cable rate, T1, T3, etc.) or any variance thereof (variances due to shared lines or current equipment loads, etc.). Technology for determining connection speeds is known (Internet speed tests, Apple Quicktime, etc.), however, the present invention has several unique features including the building of the master movie "on the fly" (automatically, via programming). Building the master movie on the fly saves development time, particularly in systems with multiple assets (or content) that are streamed to users and for which connection speed information is needed. Developers using the present invention do not have to build connection speed devices for each content streamed to users.

Once the content viewer 160 runs the master movie, the master movie requests the asset requested that corresponds to the connection speed determined by the master movie. The application server 120 then sends an appropriate player to the content viewer, and streaming server 135 begins streaming content to the player now running in the content viewer's browser (rich media content and player 170, for example).

The present invention also builds the movie player "on the fly". In one embodiment, the application server 120 builds several versions of the movie player for each of a set of popular connection speeds, and, after receiving a request from the master movie, downloads the appropriate player to a content viewer. The application server has resources available, including, for example, GUIs and applications 122 to build movie players and master movies, and database server 124 and corresponding database storage 126. Building the several versions of the players before the master movie request for a player matching the content viewer's connection speed allows for the player to be downloaded immediately upon the request from the master movie. However, the movie player could be built at other times, including after receiving the connection speed from the end user's machine and then downloading the player to the end user. Waiting till after the connection speed is known has the advantage of using less processing time to build the player, since only one player need be built, but would incur a time lag because the player needs to be built.

Therefore, the present invention includes the combination of master movie and player creation on the fly. Each process reduces complexity and developer time required to provide content services such as rich media content to end users.

Figure 2:
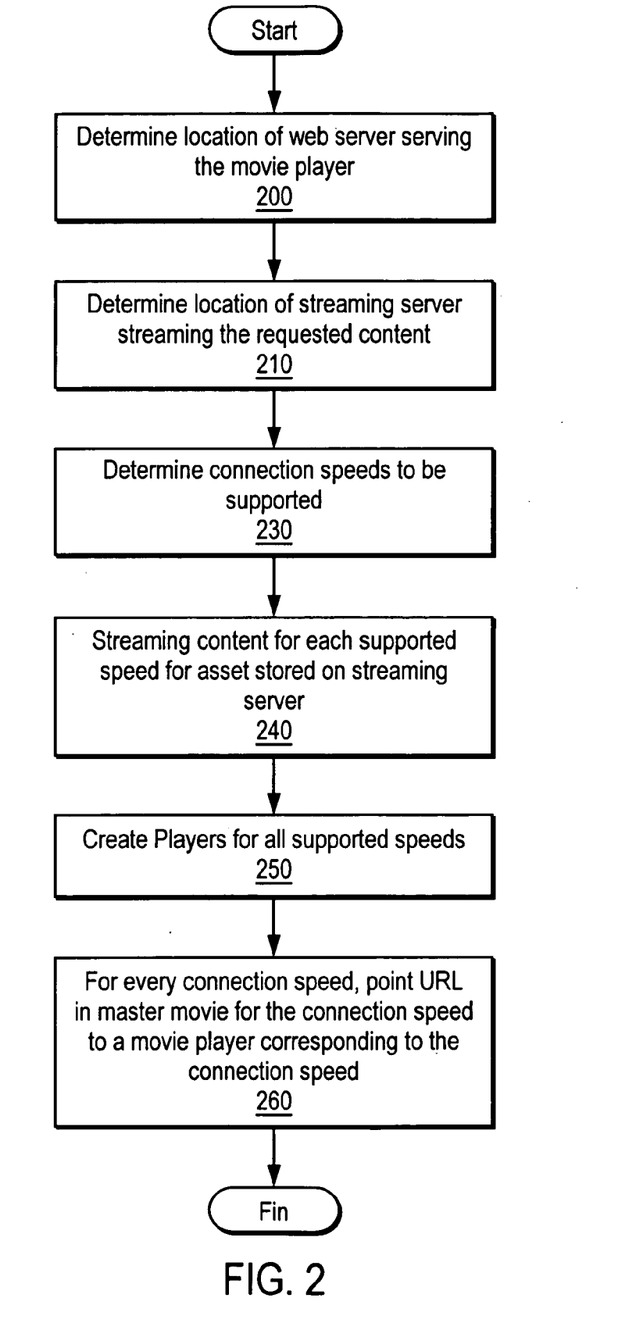
FIG. 2 is a flow chart of example high level processes implementing an embodiment of the present invention.

FIG. 2 is a flow chart of an example high level process for creating a master movie according to an embodiment of the present invention. At step 200, the location of a web server serving the movie player is determined. For example, the provider web server 100 is responsible for serving (uploading to content viewer's) movie players. The location is, for example, a URL referencing the web server 100. At step 210, the location of the streaming server responsible for streaming the requested content to a content viewer is identified. For example, the streaming server 135 is responsible for streaming rich media (or other content) as requested by the content viewer (e.g., as requested by the master movie). Again, the location may be a URL or other reference identifying the streaming server.

At step 220, the connection speeds to be supported are determined. A basic set of supported connection speeds may be a low speed connection 56k and a high speed connection such as cable (an average of typical cable speeds may be utilized). A more comprehensive set may include all of the standard connection speeds (46k, ISDN, DSL, Cable, T1, T3), and other speeds. The streaming content for each supported speed (different contents (assets) embodying the same basic rich media, movie, graphics, etc, but at the various connection speeds supported) is stored on the streaming server at a location corresponding to the streaming content (step 230). At step 240, the different players for all assets and supported connection speeds are created and stored (e.g., on web server storage space 105). Steps 230, saving streaming content, and 240, creation and storage of the players, are typically off-line steps not performed in sequence when creating a master movie, but are steps needed for proper operation of the master movie. Furthermore, each of the above steps may be performed in a different order than noted herein, the order discussed being merely an example.

At step 250, for each connection speed supported, a corresponding player is created. At step 260, for every connection speed, the master movie is created with a URL in the master movie pointing to the player supporting the corresponding connection speed. For example, if a movie player for content "Fuji Camera" is stored on the web server 100 at location /suppliers/Fuji/, then the URL in the master movie would be http://www.provider.com/suppliers/Fuji/Fuji Camera.mov (.mov=Apple™ Quicktime™ movie player format, for example.

Figure 3:
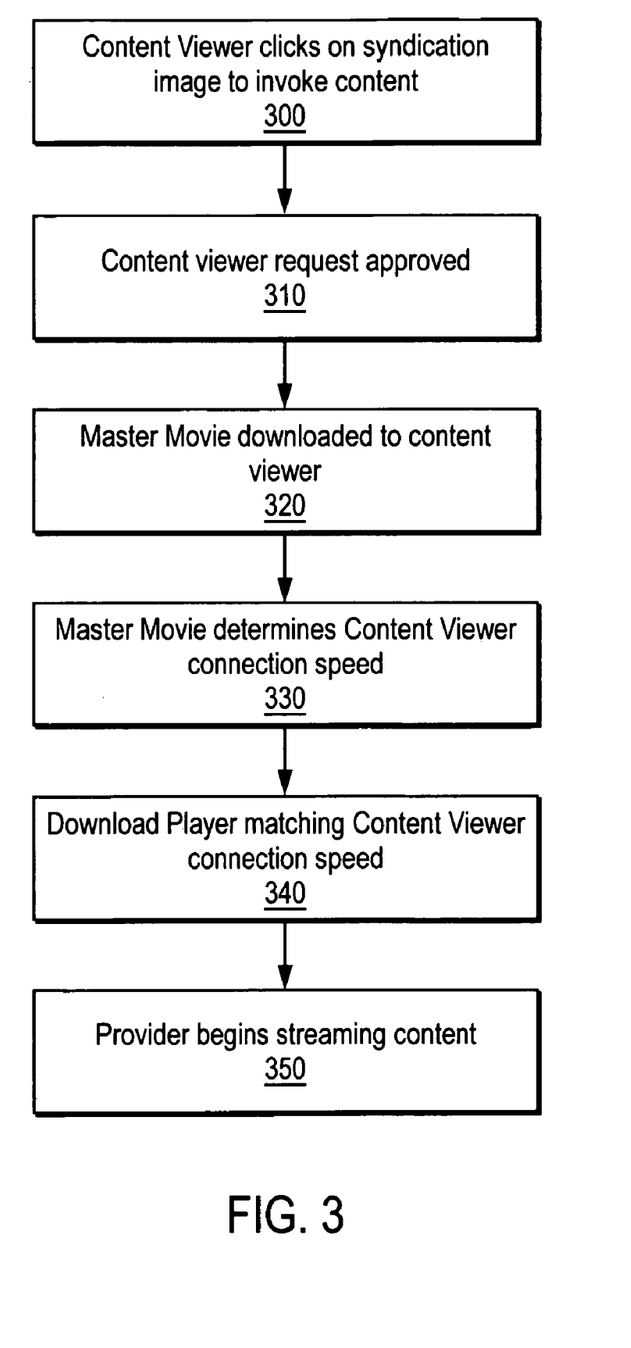
FIG. 3 is a flow chart illustrating high level processes of an embodiment of the present invention for using a master movie and player created on the fly.

FIG. 3 is a flow chart illustrating high level processes of an embodiment of the present invention for using a master movie and player created on the fly. At step 300, a content viewer clicks on a link to content. Preferably, the link is a syndicated link that initiates a request for the content from a provider (see Lee et al, noted above). At step 310, the content viewer is approved for viewing the requested content. In systems where security of the content requested is not an issue, approval would not be necessary. After approval, the master movie is downloaded to the content viewer (step 320).

The master movie executes on the content viewer (end user's) machine, determines the content viewer's connection speed (step 330). The connection speed is determined by the master movie by reading a profile previously set on the content viewer's machine. Alternatively, the master movie, which may be embodied as a Java script that runs on the content viewer's machine, requests a file download (typically a file size of between 1k and 10k). The master movie times how long the file takes to download, and based on this download time determines the connection speed.

After determining the connection speed, a request is sent to the provider to downloads a player (built on the fly) that matches the content viewer's connection speed (step 340). Then, the provider begins streaming the requested content to the content viewer (step 350). It can been readily seen that, if a provider hosts a number of assets for a number of suppliers, and provides these assets to any number of content viewers (the content viewer's having any number of different connection speeds), that a large number of master movies and players would be created for optimal system speed and efficiency. In this case, then, the use of the present invention to build master movies and players as described herein saves large amounts of design time building individual master movies and players.

Figure 4:
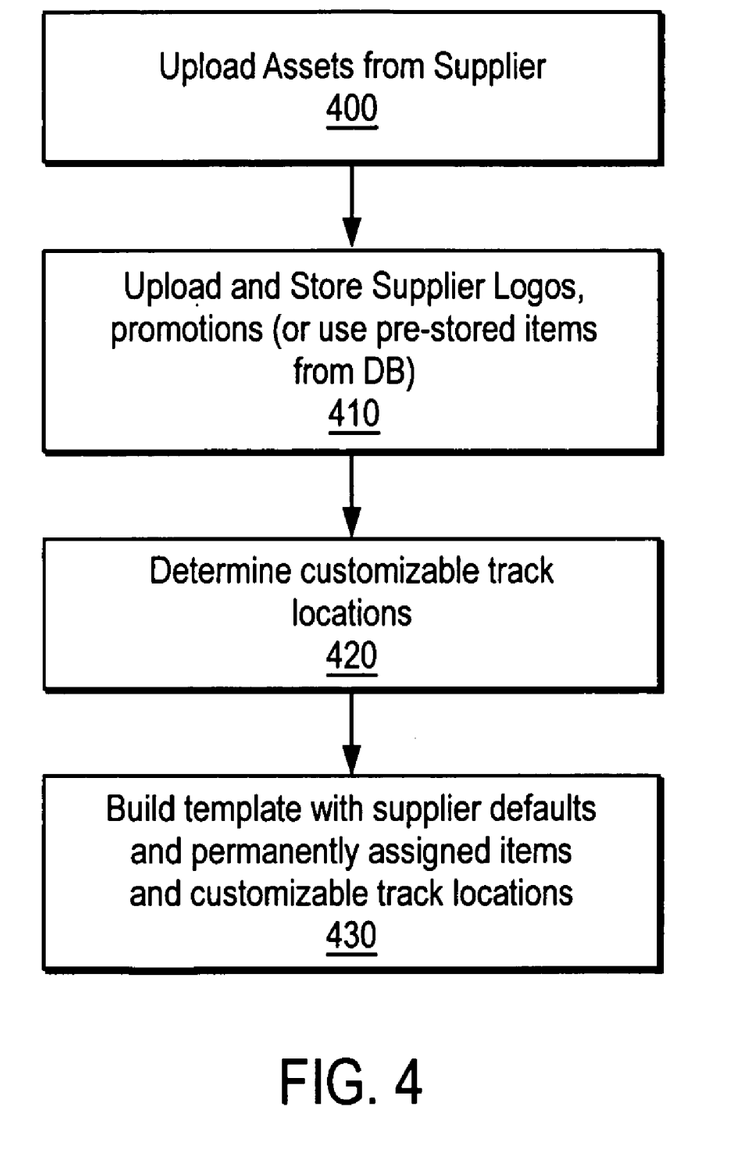
FIG. 4 is an example of a high level process for preparing a template for use in building an on the fly player according to the present invention.

FIG. 4 is an example of a high level process for preparing a template for use in building an on the fly player according to the present invention. At step 400, a supplier uploads assets to the provider. The assets are rich media content products, or any of video, graphics or other products that may be downloaded and viewed by a content viewer. A database infrastructure 126 is set up at the provider side to catalog and store each asset, parameters, and players created for each asset. This database infrastructure is also used when creating the master movie (step 260, for example)

A set of parameters for the template are also uploaded to the provider from the supplier (step 410). The parameters include, for example, the supplier's logo, a logo for a product highlighted by the received asset (or a logo that is identified with the asset), and information about promotions associated with the example. Generally speaking, promotions are time limited special offers or time limited information related to or regarding the asset. Other parameters received include anything regarding the shape, form, environment, or other attributes of the asset or it's player, which is left as an engineering decision for a designer of a system consistent with the present invention.

Steps 400 and 410 may be performed by a Graphical User Interface (web based, for example) having fill in areas with browse buttons for identifying the asset and various parameters. The parameters and asset are then uploaded from the supplier or a chosen production company (or other third party) to the provider. Alternatively, the fill in areas may be pull down menus identifying a set of predetermined selections for each parameter, or a pull-down selection of pre-defined sets of parameters to be associated with an asset. The predetermined selections or predetermined sets of parameters may be saved on the provider's side (e.g., in a database on disk 130, for example) for the supplier's convenience. Any method of identifying the asset and parameters to be associated with the player template for the asset may be utilized, the above description being example implementations of this aspect of the invention.

At step 420, the supplier identifies customizable tracks of the player to be created. For example, the supplier may identify that a skin, or background of the player may be provided by an e-tailer to match the e-tailers color scheme or other trademarks. In another example, the e-tailer may be given the opportunity to add the e-tailers logo to a corner of the movie player.

In addition, the provider also receives a list of users (e-tailers) that are approved to access the supplier's asset. Again, as with each step listed thus far in FIG. 4, this step may be performed via a GUI or other mechanism that allows the supplier to identify a customized or predefined set of users that are approved. In addition, the supplier is provided opportunity to re-define, add to, or delete any of the parameters or approved users using the same GUI or another mechanism. These steps may be performed together, in sequence, or individually in any order.

Furthermore, the supplier may rely on a predefined set of options and parameters. For example, the supplier may have a standard set of logos and/or promotions, and typically allow an e-tailer to make certain changes (such as background and e-tailer logo additions) to the movie player. In this case, the supplier may set up a predefined set of logos, parameters, etc, and then, instead of individually specifying these when uploading an asset, simply invoke the predefined set of options and parameters. The predefined set of options and parameters may be kept in a file stored on application server datastore 130, for example.

At step 430, the provider collects all the information from the supplier and builds a template or skin with pre-assignable tracks for finishing a player. In one embodiment, the information collected from the supplier provides a complete set of information for building a player. In this embodiment, no customization of a player according to the user (e-tailer's) preferences is available. However, in a preferred embodiment, the information collected from the provider allows for track locations to be filled out by an e-tailer (customizable track locations), including track locations for any of logo's, background colors/styles, promotional tracks, and a buy button, for example. Typically, a set of supplier defaults are provided such as a default skin, or logos for placement in e-tailer modifiable tracks, and, if the e-tailer does not supply the corresponding tracks, the supplier named defaults will be utilized.

The buy button (see buy button 890, FIG. 8C, for example) provides a link to a back end application hosted on the provider's application server. The back end application is invoked by the buy button link and collects all the required data regarding the product to be purchased. The collected data is formatted as required by the e-tailers web server. For example, if the e-tailers web server is XML based, the back end application contains all the logic necessary to create and format an XML file as required by the e-tailer. The XML file is then sent to the e-tailer (via web server 100 and proxy connection 107 to the Internet and on to the e-tailer's web server where the XML file is forwarded to the e-tailer's application server 158). In another example, the e-tailer may provide a special web page that the provider can pass all the necessary information to add the item to the content viewer's shopping cart. The provider's back end application then performs a post operation sending that information to the e-tailer and adding the item to the content viewer's shopping cart.

As with all communications between servers, the post and XML file are transmitted from the provider application server 120 to the receiving server (user/e-tailer application server 158, in this example) via proxy connections 107, 157 and each respective web server (100 and 150, in this example). However, although the presented method is preferred, other methods of communication may be employed.

The buy button may be of any size, shape, and include any of text or graphics. Typically added text or graphics is for identifying the button. Note buy button 890 includes the text "Buy Now ! ! !." Other text, or a combination of text and graphics may be utilized.

In addition, the buy button is not limited to a specific page or player, and may be placed on any of QTVR, movie, accessory, features, or an associated page. And, it is preferred that the buy button be applicable to an item currently being viewed, whether that item is a product or an accessory for a product.

Figure 5A:
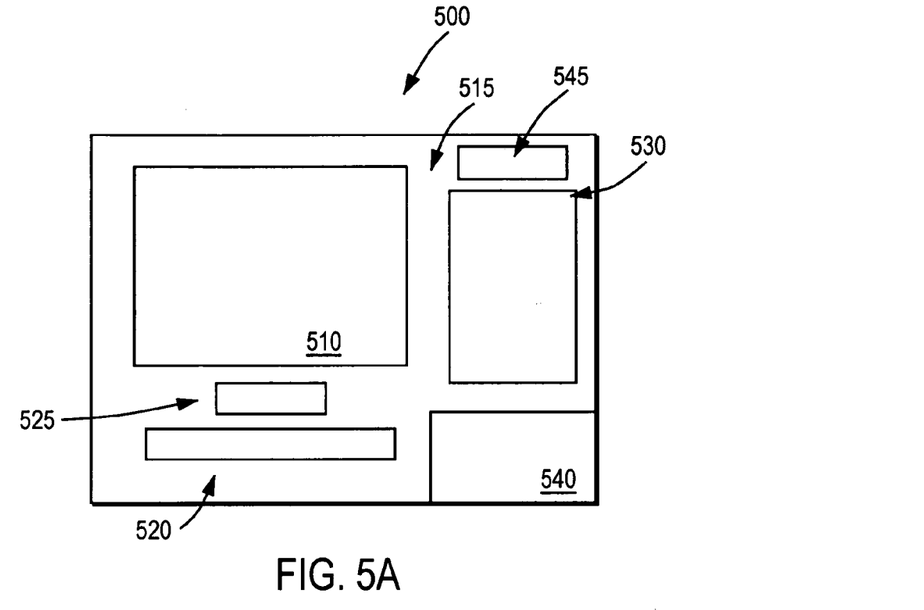
FIG. 5A is a diagram illustrating an example player template with tracks according to an embodiment of the present invention.

FIG. 5A is an example template, or skin 500 with assignable track locations within an area 515. The skin 500 is an example of a template or skin that may be built under step 430 of FIG. 4. However, typically, some information from the supplier, such as supplier's logo, etc. will have been filled out by step 430. In this example, a screen area track location 510 is provided for a content track, track location 520 provides an assignable control area, also referred to as a chrome button track location (a chrome button track typically having been assigned thereto by a supplier in step 410, or by predetermined options and parameter selection), and a zoom control track location 525 for applying a zoom control or other track. Track location 530 provides an area for assignable links, such as features or accessories of the subject of the content to be displayed in display area 510 (the assignable links area is also typically assigned a track by the supplier). And, logo area 540 provides a track for inserting an e-tailer's logo. The logo track may be a single track for simplicity (as shown in FIG. 5A), or, alternatively, may be broken into several track areas for additional logos (logos for the provider, the supplier, and the e-tailer, for example). The number of logos provided on the template can be determined by arrangement between any of the supplier, e-tailer, and provider, however, as a general business principle, it is the supplier that will have decision making power to determine what logos may be presented on the final player, and therefore determine which of the logo tracks (or sub tracks) are assignable. But generally, at least the e-tailer (e.g., track location 540) and supplier's logos (e.g., track location 545) are provided track locations. Such assignable track locations may also include a track location for a buy button track.

Figure 5B:
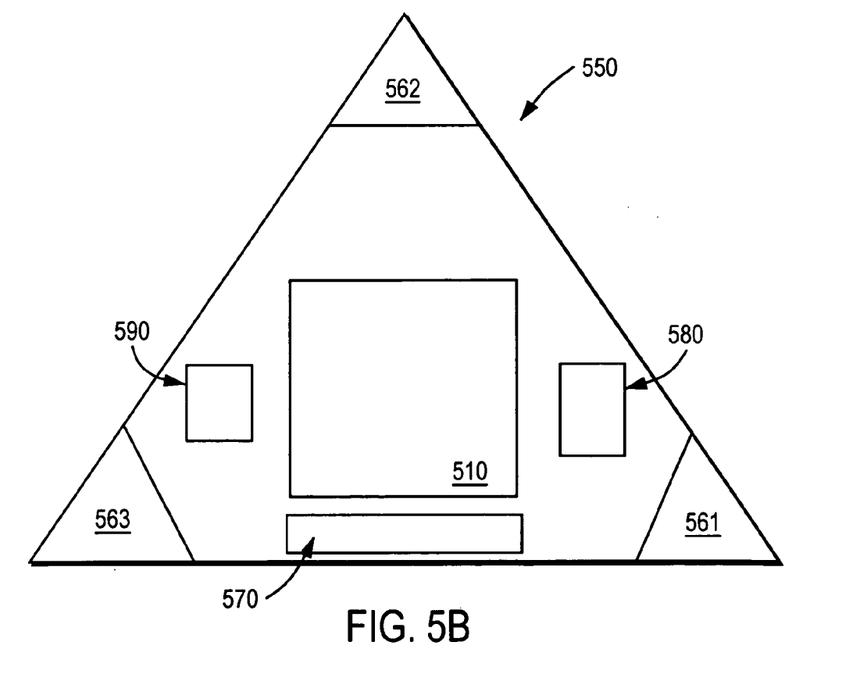
FIG. 5B is a diagram illustrating an example player template with tracks according to another embodiment of the present invention.

FIG. 5B is another example of a template or skin 550 according to the present invention. This example illustrates that the present invention is not limited to building players of standard sized rectangular dimensions, but may be constructed of any shape or style and limited only by the capabilities of the equipment displaying or playing the final player. The skin 550 includes control button track location 570, link related track location 580, logo track locations 561–563, and promotional track location 590. The track locations may be of any shape or size and placed on any part of the template.

Promotional tracks are tracks reserved (or that may be utilized) for any special information, typically time limited, such as a sale, or special promotion on the subject of the asset (or content). In addition, promotional tracks can link to "infomercial" type displays or contain political or other statements.

Figure 6:
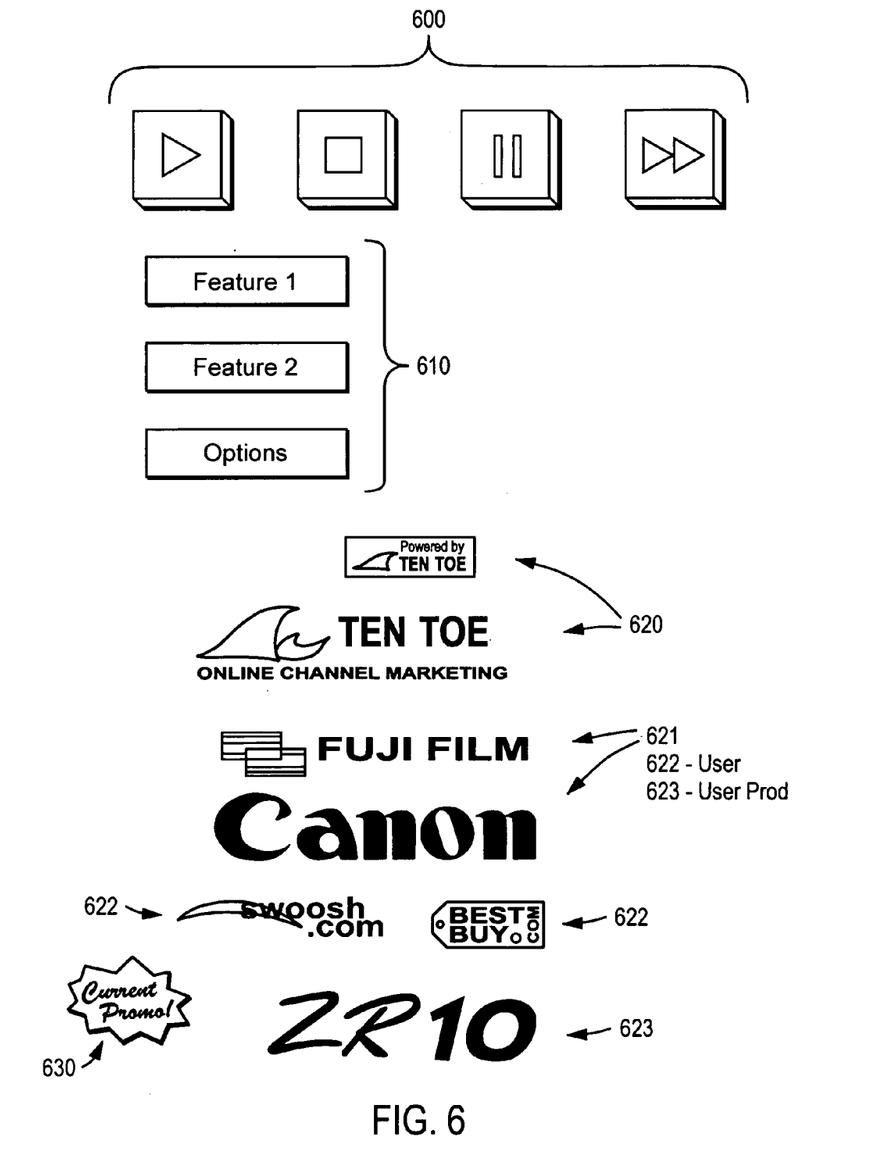
FIG. 6 is a set of example tracks that may be stored in a database or uploaded by suppliers and users/e-tailers according to the present invention.

FIG. 6 is a set of example tracks that may be inserted into the available tracks of a template of skin. Control button track 600 might be selected for placement in any of the control button tracks 520 or 570, for example. Links track 610 may be placed in any of the link related track locations, logos 620–623 (representing a provider 620, supplier/manufacturer 621, user/e-tailer 622, and product logo 623, for example) may be placed in any of the logo track locations, and example promotional track 630 may be placed in any available promotional track. Typically, the user (e-tailer) is limited to placing a certain set or type of track into the available track locations (e.g., control button tracks go into control button track locations), however, other variations or creative combinations may be permitted.

Table 1 provides a listing of an example set of tracks and individual track information (rules, constraints, etc.). Table 1 is considered a typical set of tracks available for customization in a template or skin as provided or specified by a provider, and/or as modified by a user (e-tailer). Many other combinations of tracks, and individual rules or constraints on each track may implemented and still be consistent with the present invention.

TABLE 1

| | |
|---|---|
| Background | Part of the skin. This track can be replaced. |
| Provider Logo | Will be the same for all players. This track can be disabled if the client (supplier or e-tailer) insists. |
| Product Logo | This logo will be different for different products. |
| Company Logo | The e-tailer (user) logo. Will be different for each e-tailer. |
| Main Video | The main movie track used to show the product movie. |
| QTVR | To show the Virtual Reality or 360°, rotate, tilt, zoom (content viewer controlled) movie. |
| Accessories | Accessory list of a product. Will be different for each product. |
| Features Menu | The feature list for a product. Will be different for each product. |
| Movie Controls | Button(s) to control the movie play, stop, pause, etc, and QTVR zooming in and out. It is also part of the skin. |
| Chrome Buttons | Button for the user to switch from Main Video view to Accessory or QTVR view. |
| Buy Button | A button that activates a back end connection to the e-tailer to place the item currently being viewed by the content viewer into the content viewer's shopping cart. |
| Sound Effects | Sound track. |

Figure 7:
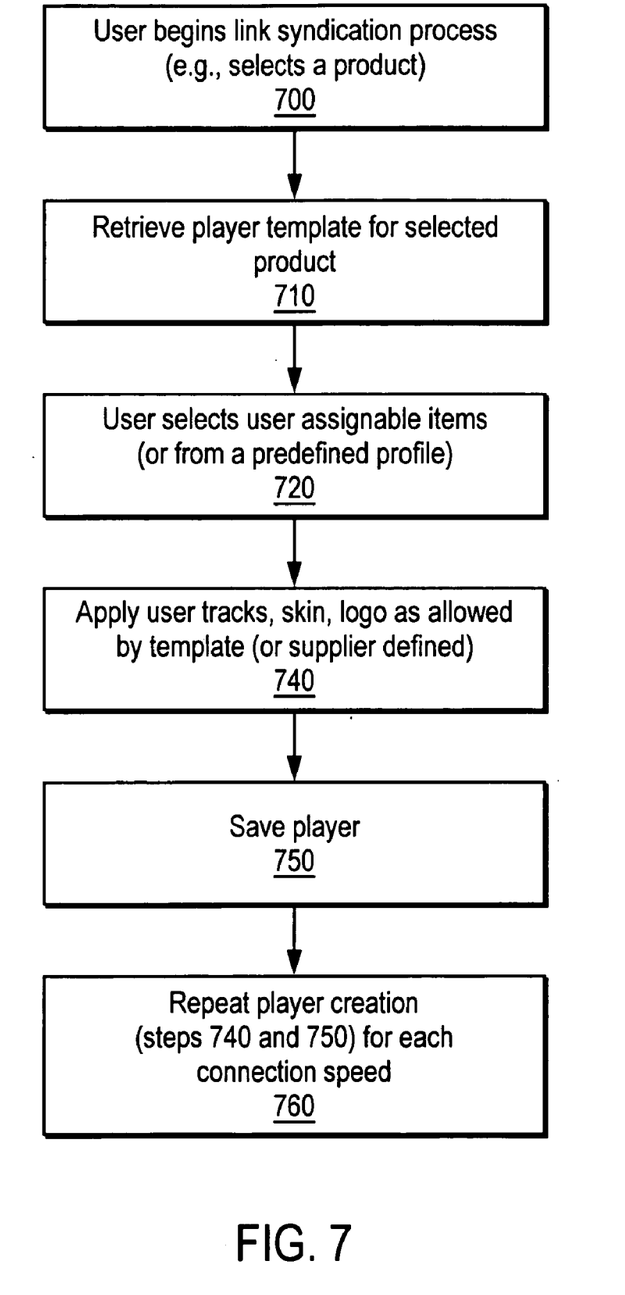
FIG. 7 is a flowchart that illustrates an example process for constructing a player skin or template and customization of the player via addition of tracks according to an embodiment of the present invention.

FIG. 7 is a flowchart that illustrates an example process for constructing a player skin or template and customization of the player via addition of tracks according to an embodiment of the present invention. At step 700 a user (e-tailer) begins the process of syndicating a link for a specified product. The link creation process as described in the above referenced co-pending patent application may be utilized.

Alternatively, any method of generating a link, including a link that directly accesses the player and content may be utilized. The link itself may be generated at any point in the process, the important part of step 700 is the identification of the product (or other content) to which the link is being generated.

At step 710, using the user (e-tailer) specified product, the provider retrieves a template or skin designated by the supplier of that product. The user (e-tailer) provides player parameters that identify the user's selection of tracks or other user selectable items for the player (step 720). In a preferred embodiment, the e-tailer has a set of at least one predetermined profiles that are selected and identify a set of the user's parameters. For example, a predetermined profile might contain a set of button having a consistent chrome style for control of the player, the e-tailer's logo, and a background that is a combination of colors and/or a pattern that is associated with an e-tailer (predominately yellow for Best Buy, for example) The predetermined profile may be used in combination with the selection of special features such as a promotional track. Alternatively, a graphical user interface or other mechanism provides a method for the user to select each of the various parameters (logo, background, etc.).

At step 740, the user selected tracks are applied (published) to the player. The supplier may have set some (or all) tracks in a manner that restrict the e-tailer (do not allow an e-tailer to assign a specific track, set of tracks, or limit an e-tailer's choices for an assignable track, for example) These restrictions would be set up at the provider by the supplier (steps 400–430, for example) indicating whether the track is merely a default (and therefore overridable by an e-tailer), or if the track is permanently assigned. If permanently assigned by the supplier, a specific track from an e-tailer's profile is prevented from being utilized in the player.

Table 2 provides a listing of typical tracks and/or other data that are placed in the predefined track locations of a player template or skin to produce the final player. Table 2 also identifies whether the track selection is user selected or established by the supplier, and is considered a typical allocation of selection responsibility. However, responsibilities for track selection may be divided any number of ways between the various entities (supplier, e-tailer, provider).

TABLE 2

| | |
|---|---|
| Change of the Skin | Background, Movie Ctrl, and Chrome Buttons tracks. Chosen by the user (e-tailer). |
| E-tailer logo | E-tailer's Company Logo track |
| Product Logo | This logo will be different for different products. Provided by the supplier. |
| Features Menu track | Features of the product. Provided by the supplier. |
| Accessory track - | Accessories available for the product. Provided by the supplier. |
| Main Video track | Main Video track is modified by the provider to point to the right URL to access the streaming video. |
| QTVR track | QTVR track is modified by the provider to point to the right URL to access the QTVR video. |
| Sound Effects track | Sound Effects track may be selected by either the supplier or e-tailer. |
| Promotional tracks | May be selected by either the e-tailer (having a sale), or supplier 9a new promotion or rebate being offered). |
| Buy Button | Assigned by the e-tailer. Points to e-tailer specific back end between the provider's application server and the e-tailer's application server. |

At step 760, steps 740 and 750 (saving each player created) are repeated for each of a set of predetermined connection speeds, producing a set of players which are saved and ready for downloading to end users (content viewers) that initiate the players via the corresponding syndicated (or other) link (step 340 of FIG. 3, for example). Preferably, the players built at different connection speeds will have a different size main video track to accommodate the different connection speeds (bandwidths associated with the different connection speeds). For example, a 56k connection would have a small main video track and a T3 connection would command larger main video track.

Figure 8A:
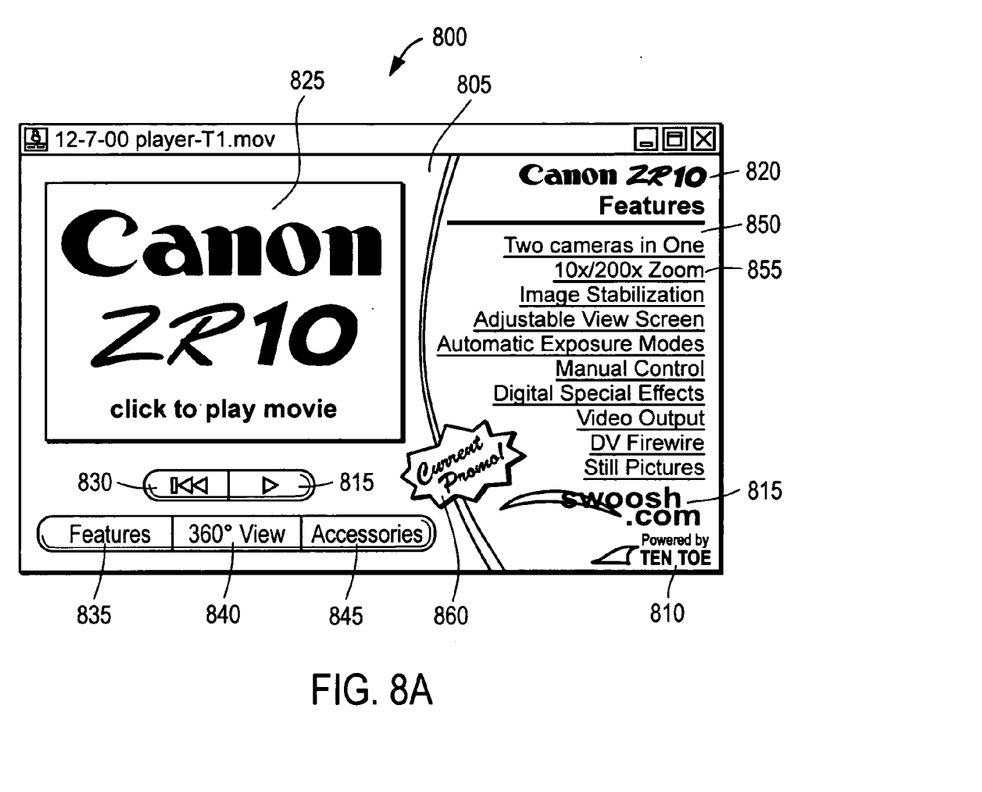
FIG. 8A is an example movie player 800 constructed according to the present invention.

FIG. 8A is an example movie player 800 constructed according to the present invention. The player 800 includes a background 805, which can be part of a skin selected for the player or an individually selected track (alternating gray and white horizontal lines in this example). Provider logo 810, user (e-tailer/company) logo 815, combined manufacturer (supplier) & product logo 820, each of which are installed on individual tracks. Each of the examples presented in FIG. 8A are built upon individual tracks, however, combinations of separate logos or other items on the player may be combined into a single track. A main video or main movie area 825 resides on the main video or main movie track as discussed above. Buttons, including movie control buttons 830 for starting and rewinding the movie in the main video area, Features Button 835, for activating a list of features and corresponding links (see Features area 850), QTVR (360° view) button 840 that activates a user directed virtual reality view of a product or other item being presented in the main video area 825 (see FIG. 8C, for example), and Accessories button 845 which activates a list of accessories that replaces the features area 850 (see FIG. 8B, for example). The features area 850 has a number of links (10×/200× Zoom 855, for example) that, when selected, direct the content viewer's attention to specific points of the main video (auto fast forward to a point in the video) that show or describe the feature indicated by the link selected. Any number of arrangements, buttons or links may be arranged using the various templates, skins, and/or tracks.

FIG. 8A also shows a promotional track 860 having been filled with a "Current Promo !" starburst shaped track (the track may have any shape, colors, and/or added text). Content viewer selection of the promotional track 860 directs the content viewer to any of a special video or other web page that describes a current promotion running for the subject of the main video. For example, in this case, the promotional track may be a page or special video describing a discount price offered on the Cannon™ ZR10™ digital camera, a rebate, special package detail (camera, bag, and tripod only $5 more, for example), or promos on other items such as discount airline tickets, vacation packages, and or steeper discounts on additional equipment purchased with the digital camera, for example. Any type of promotion may be promoted using the promotional track. The promotional track may be filled by the supplier or the user (e-tailer).

Promotions typically run for a specified length of time (January Clearance sale, or 3-day sale, this weekend only, or special deal limited time offer between any two dates), or may occur periodically (end of the month sale, weekly Saturday sale, etc.). The supplier and user (e-tailer) are provided with a GUI or other input mechanism to provide information about the promo, including, a link for the directing a click on the promotional track, the dates that the link should be valid, and any recurring features of the promo.

The promo information is maintained at the provider's site. If the promotion is current, the players then built are constructed to include the promotion in the promotional track. Alarms are set at the provider site, and, when the promotion ends (based on the dates entered by the supplier or user/e-tailer), the players are rebuilt (on the fly) without the promotional track (using a default promotional track, other specified promotional track, or no promotional track). In the case of no promotional track, the promotional track would be disabled or deleted from the movie player so the content viewer does not see it.

If the promotion is not current, the players then built are without the promotional tracks, and, when the promotions become current, an alarm at the provider's site initiates re-building of the players with the now current promotions. The newly re-built players are utilized for content viewer requests, until an ending alarm occurs indicating that the promotion is no longer valid, and the players are again re-built without the promotions, or with a substitute promotion that becomes valid at the same time. In one alternative, the previously built players without the promotional track are saved and re-used instead of re-building non-promotional players.

In another example, when a player is requested, the promotional tracks (identified by the database infrastructure) are checked to determine if they are still valid. If not, the movie player is re-built, on the fly, and the newly rebuilt player is utilized to play the requested content. Using this method, only the first content viewer that views content after initiation or expiration of a promotion is hit with any delay that may be imposed by rebuilding the movie player.

In yet another example, promotional tracks are checked for validity on a predetermined basis. If, when checked, the validity of nay promotional tracks have changed since a previous validity check, then the player utilizing those tracks are rebuilt to reflect the correct status of the promotional tracks used by the movie players.

In yet still another example, for each promotional track provided a different movie player is produced for the corresponding promotional track along with a movie player without any promotional track. When a movie is requested, the movie player having the currently valid promotional track, or, if no promotional tracks are valid, the movie player without a promotional track, is forwarded to the content viewer.

Figure 8B:
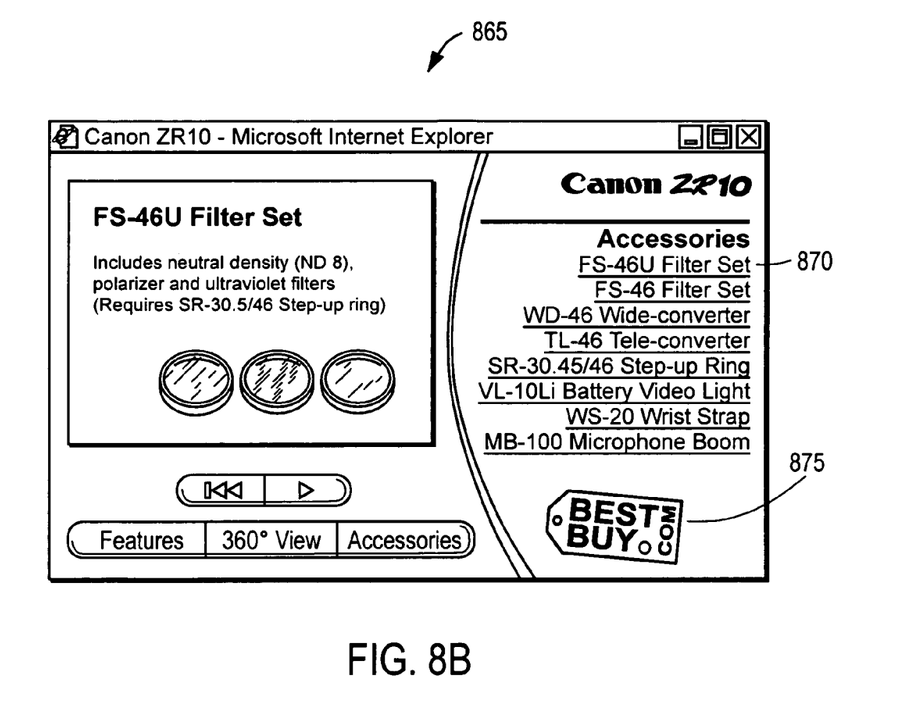
FIG. 8B is an example of an accessories screen 865 after content viewer selection of an accessories button.
Figure 8C:
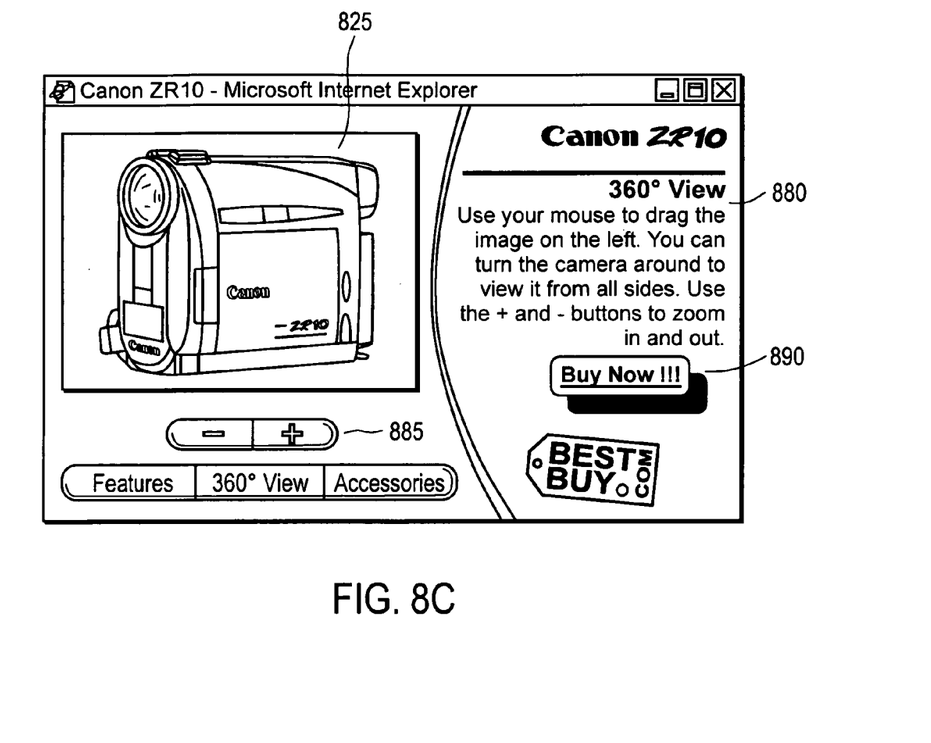
FIG. 8C is an example of the a QTVR screen that is streamed to the content viewer upon QTVR or "360° View" selection.

FIG. 8B is an example of an accessories screen 865 after content viewer selection of an accessories button (845, for example). In this example, the player features an accessory list 870. Content viewer selection of an accessory brings up a special screen or video in the main video area describing the selected accessory (FS-46U Filter Set in this example). It is noted that accessory screen shows a different e-tailer logo 875, which is shown to illustrate other combinations of logos that may be selected for the tracks (in this example, only the e-tailer logo shows up in the logo track, where previously, FIG. 8A, 2 logos, the e-tailer and provider logos appeared). When navigating between screen of the player, Accessories, Features, etc., the e-tailer normally stays the same because it is the e-tailers site that referred the content viewer to the asset, which, in this case, is streaming video and other links for the Cannon™ ZR-10™. Also note that FIG. 8B provides an example of a player without a promotional track, as the screen would appear when the promotion is not active (i.e., not within the dates set for the promotion by the e-tailer and/or supplier).

FIG. 8C is an example of the a QTVR screen that is streamed to the content viewer upon QTVR or "360° View" selection 840. The main video area is presented with a graphic (or picture) of the subject of the syndicated link, and a set of instructions 880, and a set of +/− zoom buttons 885 now present on the screen. As the user moves the image according to the instructions, the provider streams the required video supporting that move (rotate, zoom, tilt, etc.).

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, retrieving and storing supplier and user/e-tailer selections, building master movies and players on the fly, including applying supplier and user selected tracks to player templates of varying connection speeds, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method, comprising the steps of:
    after receipt of a rich media request from a consumer web browser invoking a link on an e-tailer web page, building a set of rich media players on-the-fly at a third party server, comprising,
    accessing a predefined template comprising a basic movie player having track locations and designed to operate at a predetermined connection speed, applying a set of selected tracks to the track locations of said template, saving the player in a place accessible on the third party server, and repeating the steps of accessing, applying and saving for a each of a set of predefined templates designed to operate at different predefined connection speeds;

receiving a connection speed identifier;

uploading one of the built on-the-fly players corresponding to the connection speed identifier from the third party server to the consumer web browser; and serving the requested rich media content to the uploaded player.

2. The player according to claim 1, wherein:

at least one of the track locations of said template is at least one of a promotional track location and a track location that may be used as a promotional track location;

at least one of said selected tracks is a promotional track; and said method further comprises the steps of, placing said promotional track in said promotional track location;

receiving a page or other asset to associate with said promotional track; and linking said promotional track with said page or other asset.

3. The method according to claim 2, wherein said method further comprises the steps of:

receiving a set of parameters indicating when said promotion track is to be active;

building the players consistent with said set of parameters;

rebuilding said players to include promotional tracks when said promotional tracks have become active; and rebuilding said players to remove promotional tracks when said promotional tracks have become inactive.

4. The method according to claim 3, further comprising the step of:

checking the validity of a promotional track used in a player when the player is requested to play; and performing said steps of re-building if the promotional track has become active or inactive.

5. The method according to claim 3, further comprising the steps of:

building additional sets of rich media players, each additional movie player set having a different set of selected tracks applied to the track locations;

checking validity of the set of selected tracks in the rich media player prior to uploading the rich media player and only uploading the rich media player if it does not have invalid tracks.

6. The method according to claim 1, wherein said step of applying comprises:

applying a set of supplier selected tracks to the track locations of said template; and applying a set of user/e-tailer selected tracks to the track locations of said template.

7. The method according to claim 1, further comprising the step of:

after receipt of the rich media request, downloading a master movie to the consumer web browser corresponding to the rich media content requested, and receiving a request from the master movie indicating rich media content matching the rich media request and a connection speed of the content viewer.

8. The method according to claim 7, wherein said connection speed is determined by said master movie by reading a profile on a host machine used by said content viewer.

9. The method according to claim 7, wherein said connection speed is determined by said master movie by performing the steps of:

downloading a predetermined file from a server; and calculating the connection speed using the file size and time required to download the file.

10. The method according to claim 1, wherein:

at least one of said track location is a buy button track location; and said method further comprises the steps of, applying a buy button track to said buy button track location, and linking a back end application configured to add an item to a content viewer's shopping cart to said buy button track.

11. A computer readable medium encoded with computer executable instructions, that, when loaded and executed by a computer, performs the method of claim 1.

12. The method according to claim 1, wherein the saved player comprises an entire solution for playing the movie and displaying the applied tracks on a computer without reference to movie players resident on the same computer or elsewhere.

13. The method according to claim 1, wherein the connection speed identifier comprises a communication from a built on-the-fly master movie built and then uploaded to the end user computer system after receipt of the rich media request.

14. The method according to claim 13, wherein the master movie determines the connection speed to identify without interaction with the user of the end user computer system.

* * * * *